UNITED STATES PATENT OFFICE 2,317,253

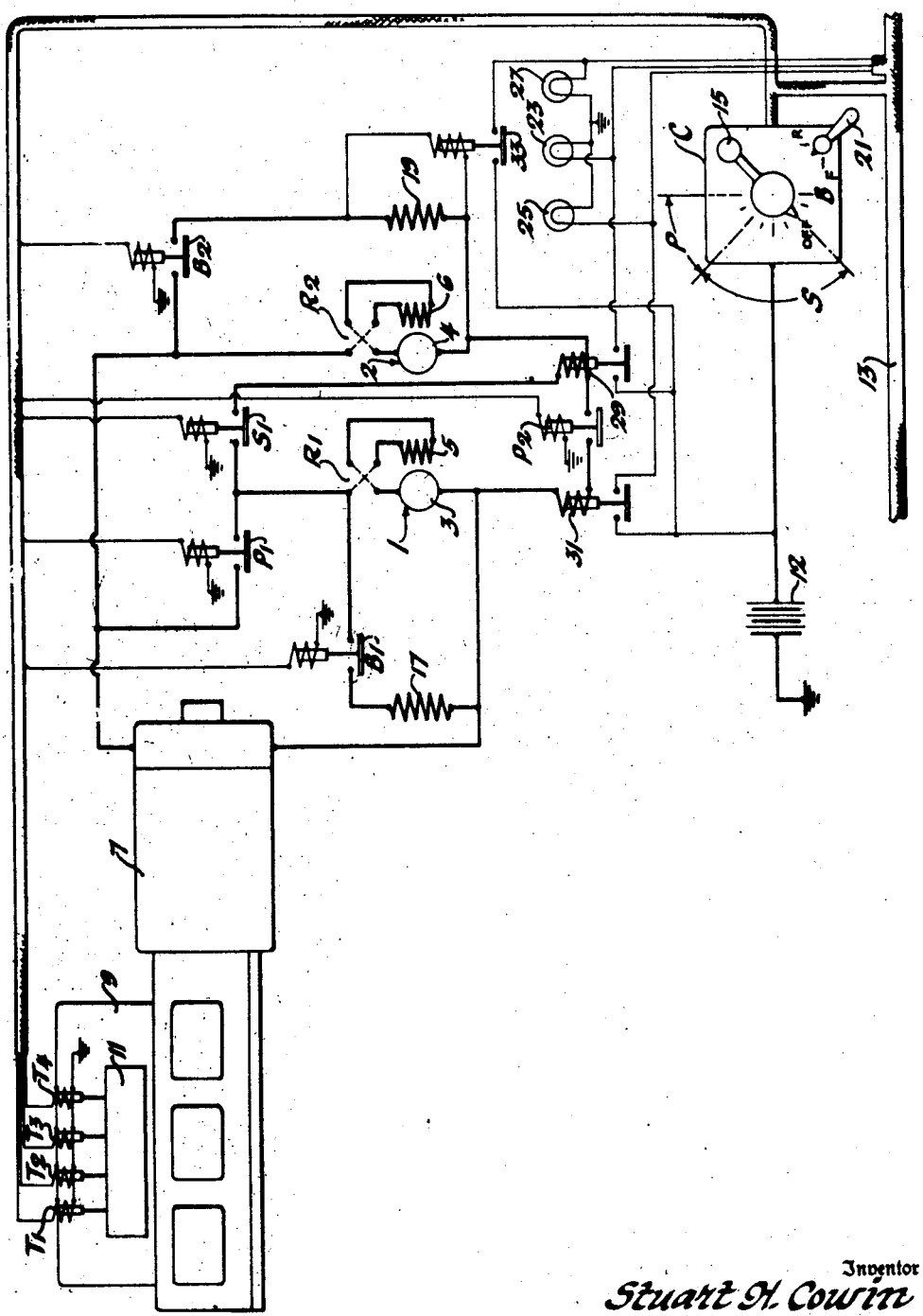

DIESEL ELECTRIC DRIVE AND CONTROL SYSTEM

Stuart H. Cowin, Chicago, Ill., assignor to General Motors Corporation, Detroit, Mich., a corporation of Delaware Application March 13, 1940, Serial No. 323,755

4 Claims. (Cl. 177—311)

The present invention relates generally to power systems in which a generator driven by a prime mover furnishes energy to propulsion motors for driving a vehicle and relates more particularly to overload alarm means and a control system for such power systems.

Conventional control systems for power systems of the above type usually provide manual means for regulating the output of the prime mover and either manual means or automatic means which are responsive to voltage and/or current, either for connecting the motors in series with the generator to provide high starting torque at low values of vehicle speed, or for connecting the motors in parallel across the generator to provide torque characteristics suitable for high speed operation of the vehicle.

On vehicles such as locomotives, which are subjected to widely variable trailing loads and variable operating conditions such as are caused by grades and curves, it has been found that serious overloading of the power system results, due to the inability of the operator to select the proper motor connection to meet the demand imposed on the vehicle as a result of these variable conditions. Where automatic means are provided to accomplish transition between the series and parallel motor connections it has been found that under certain operating conditions one or the other of the motor connections is maintained, where if manual means were provided to lock out the automatic means and change the motor connection manually an increase in tractive force could be obtained from the locomotive. The automatic transition control means also has a tendency under certain operating conditions to hunt, which causes the motor connections to be continuously changed between the series and parallel connection, which causes unstable operation of the power system and arcing of the contactors controlling these connections.

In order to overcome the shortcomings of the conventional control systems and provide control means whereby the power system may operate at substantially its rated output, the present invention has for its principal object the provision of simple overload alarm means which warns the operator of overloading and further provides simple manual control means whereby the output of the power system and the motor connections is changed to meet the variable conditions encountered, thus preventing overloading and enabling the locomotive to be operated at substantially its rated capacity.

Another object is the provision of overload alarm means for indicating overloading of the motors when they are connected to build up as generators to provide dynamic braking of the locomotive and train on down grades.

For a fuller understanding of the nature and objects of the invention, reference should be made to the following detailed description taken in connection with the single accompanying drawing in which the power system, the overload alarm apparatus, the control system and the control and power circuit connections are shown in diagrammatic form.

Referring now to the drawing two vehicle propulsion motors of the series type are shown at 1 and 2, each having an armature and a series field winding. The armatures are indicated at 3 and 4 and the series fields at 5 and 6. A generator 7 for supplying energy to the motors is shown directly connected to and driven by a prime mover 9. The prime mover may be a Diesel engine or any other type desired.

A governor driven by the prime mover is shown generally at 11 which controls the speed and torque and therefore the output of the prime mover 9. The governor includes conventional speed setting adjusting means, not shown, by which the prime mover speed and output may be set at any one of a plurality of values. The governor serves to actuate the prime mover motive fluid regulator, not shown, and may also serve to regulate the excitation of the generator 7 in a well known manner so that the prime mover and generator output is held constant at any one of a plurality of values.

Output regulating means $T_1$, $T_2$, $T_3$, and $T_4$ are shown, by which the governor setting may be changed for controlling the prime mover output. These regulating means comprise plungers operatively connected to the governor setting means, not shown. The plungers are moved by electromagnetically actuated devices such as coils surrounding the plungers when the coils are energized by separate control connections, which are connected to a battery 12 through a master controller C which may be located at any position on the vehicle.

A plurality of circuit connections are shown, including switches or contactors $S_1$, $P_1$, $P_2$, $B_1$ and $B_2$ whereby the motors may be connected in series or parallel with the generator for driving the vehicle or connected so that the motors will build up as generators when driven by the vehicle to provide dynamic braking of the vehicle. The switches or contactors $S_1$, $P_1$, $P_2$, $B_1$ and $B_2$ include contacts which are bridged upon movement of armatures attracted by the actuating coils of the contactors when the coils are energized by separate control conductors, which are connected to the battery 12 by the controller C. These electromagnetically actuated switches or contactors together with the electromagnetically actuated devices for regulating the prime mover output may, if desired, actuate valves to control fluid actuated means for changing the motor connections and output regulating means.

The master controller C is connected to the battery 12 and has a plurality of control circuit connections extending therefrom to each of the electromagnetically actuated means $T_1$, $T_2$, $T_3$ and $T_4$ and to the electromagnetically actuated contactors $S_1$, $P_1$, $P_2$, $B_1$ and $B_2$ to allow these means to be selectively energized. Connections extend from each of these connections to a train line 13, which may be connected to similar electromagnetically actuated means located on the same locomotive unit or other units, so that a plurality of power systems and locomotives may be controlled in multiple from the master controller C. An operating handle 15 on the controller is manually movable to a plurality of positions so that the electromagnetically actuated means may be selectively energized from the battery 12. When the handle 15 is moved in the range indicated at S, the $S_1$ contactor is energized and closes to establish a series connection of the motors 1 and 2 with the generator 7, and the output regulating means $T_1$, $T_2$, $T_3$ and $T_4$ are energized separately and in combination to satisfy the demand of the motors when connected in series. When the handle 15 is moved in the range P, the $P_1$ and $P_2$ contactors are energized and close, to connect the motors 1 and 2 in parallel across the generator 7, and the output regulating means $T_1$, $T_2$, $T_3$ and $T_4$ are also energized separately and in combination to control the prime mover output for this motor connection. In order to cause the motors to build up as generators when driven by the generator to provide dynamic braking, the control handle 15 is moved to the position B, which energizes the contactors $B_1$ and $B_2$, which close, and connects the motor 1 across a braking grid 17 and the motor 2 across a similar grid 19. With the motors so connected it is necessary to reverse the polarity of the series fields 5 and 6 of the motors to cause them to build up as generators and dissipate energy in the form of heat in the grids 17 and 19. A manually operable reverse lever 21 is provided on the controller C to reverse the polarity of the series fields by operating the reversing switches $R_1$ and $R_2$, which are connected between the motor armatures 3 and 4 and the series fields 5 and 6. The reversing switches may be moved to either of two positions by electromagnets, not shown, in a well known manner, when energized from the battery 12 under control of the reverse lever 21. When the lever 21 is moved from its neutral or off position, as shown, to the reverse position R the reversing switches $R_1$ and $R_2$ move to a position whereby the motor fields are connected to the armatures 3 and 4 to cause the motors to drive the vehicle in reverse direction when connected to the generator. When the lever 21 is left in the reverse position and the motors are connected to the braking grids, the motors build up as generators and retard forward movement of the vehicle. Conversely when the reverse lever 21 is moved to the F or forward position the reversing switches move to a position to cause the motors to drive the vehicle forward or to retard reverse movement of the vehicle. The reversing mechanism is of a well known type and if desired any well known interlocking means of either an electrical or mechanical type may be used to cause reversal of the polarity of the motor fields when the operating handle 15 is moved to the brake or B position irrespective of the position of the reverse lever 21. The above described master controller C therefore provides means for controlling the output of the power system and controlling the series, parallel or braking connections of the motors and may also control a plurality of similar power and control systems connected in multiple therewith by parallel control circuit connections extending through the train line 13 to other output regulating means, contactors and electromagnets operating the reversing switches of other power systems on the same locomotive unit or on separate units which are mechanically and electrically connected together in a well known manner.

A plurality of overload alarm signal means 23, 25 and 27 are provided to warn the operator when either the generator or motors are overloaded. These alarm means may be either of a visible or audible type but it has been found that locomotive engineers react to the visible type more quickly since all railway track signals are of the visible aspect type. The alarm means 23, 25 and 27 are shown as incandescent lamps and may be provided with different color aspect lenses if desired. These alarm means are located preferably adjacent the master controller C and have parallel connections extending therefrom through the train line to other lamps located similarly on other locomotives so that overloading of any generator or motor group will cause all of said lamps to indicate an overload condition.

The control means for the overload alarm means comprise load responsive devices 29, 31 and 33, and are shown as relays having actuating coils which, when energized by a current above the rated value of the generator or motors, attract an armature and bridge contacts connected in series with a lamp and the battery 12 to illuminate the lamp. The coil of load responsive device 29 is placed in series between the motors 1 and 2 when the $S_1$ contactor is closed to connect the motors in series with the generator and when current of a value in excess of the rated value of the motor passes through the coil, the armature bridges the contacts of the relay 29 and causes the overload alarm lamp 23 to be connected to the battery 12 and thus illuminated.

The coil of the relay 31 is connected in series with the motor 2 when the $P_1$ and $P_2$ contactors are closed to connect the motors 1 and 2 in parallel across the generator 7, and is designed to attract its armature and move it into bridging relation with its contacts when the current value through the coil is equal to one half the rated value of the generator current, which causes illumination of the overload alarm lamp 25. With the motors connected in parallel across the generator, the generator current is divided equally between the motors, one half flowing through each motor, so that the lamp 27 indicates overloading of the generator.

The coil of the relay 33 is connected across the braking grid 19 and is accordingly energized by current of a value equal to the voltage drop across the grid, which is proportional to the current through the grid 19 from the motor 2, acting as a generator upon closure of the B₁ and B₂ contactors. This coil is designed so that when the current generated by the motor 2 when driven by the vehicle and connected to build up as a generator exceeds a value equal to the rated current value, the voltage drop across the grid 19 is sufficient to cause a current flow through the coil of the relay 33 to attract and move its armature into bridging relation with the contacts of the relay 33 and thus illuminate the lamp 27 to warn the engineer of excessive braking current. As the motors are driven at the same speed by the vehicle and the resistance of the grids is the same, equal values of current will flow through each motor so that overloading of one motor when acting as a generator indicates overloading of the other when acting in like manner.

By providing a simple manually operable control means whereby the output of the power system may be regulated to supply the demand required by the motors for either the series or parallel motor connections, which are also manually controlled, the locomotive engineer may adjust the controls to meet variable operating conditions to the best of his judgment and by providing simple and effective overload alarm means to warn the operator of overloading, the locomotive may be operated at substantially rated capacity at all times. The provision of overload alarm means to warn the engineer of excessive load on the motors when acting as generators enables him to eliminate excessive loads by use of the air brakes on both the locomotive and train.

The above described alarm and control system therefore satisfies the variable operating conditions encountered and makes for more efficient operation. Any modification, such as providing manual lock out means for automatic means controlling transition from the series to the parallel motor connections and thereafter accomplishing transition by manual means, will be apparent but will require additional automatic control devices.

I claim:

1. In a vehicle, a prime mover generator power plant, output regulating means therefor, traction motors for driving the vehicle, electrical connections between the generator and the motors, separate overload current responsive means for the generator and for the motors, contactors for connecting the motors and the motor overload current responsive means in series relation with the generator or for also connecting the motors in parallel relation with the generator and for simultaneously connecting said generator overload current responsive means in series between the generator and one motor, separate alarm means operatively connected with each overload responsive means, and a manually operable controller for jointly and selectively controlling said power plant output regulating means and said contactors, said controller being selectively movable to any one of a plurality of control positions in each of two ranges to control the output of the power plant to a preselected value, one range of controller movement controlling the contactors for establishing the series motor circuit relation with the power plant generator and the other range of controller movement controlling the contactors for establishing the parallel motor circuit relation with the power plant generator.

2. In a vehicle, a prime mover generator power plant, output regulating means for the power plant prime mover, series traction motors for driving or braking the vehicle, electrical connections between the generator and motors, said connections including a generator overload current responsive device and motor overload current responsive devices, motor braking resistors, contactors operable to connect the motors in series or parallel with the generator to drive the vehicle or to connect the motors to the braking resistors to retard the vehicle and also to connect an individual overload current responsive device in each of said connections to render said device operative, said generator overload responsive device being connected in the parallel motor connection for operation at a preselected value of overload current, and one of said motor overload current responsive devices being connected in the series motor connection and the other being connected in said braking connections, and both of said motor overload current responsive devices being operable at a preselected value of motor overload current, separate color light signals operable by each of said current responsive devices, and manual means for selectively controlling said prime mover output regulating means and said contactors to enable the power plant output to be varied to vary the load current on the vehicle generators and motors for both the series or parallel motor driving connection or for establishing the motor braking connection.

3. In a vehicle, a prime mover generator power plant, speed and output regulating means for the prime mover, series type traction motors for driving the vehicle, circuit connections between the power plant generator and the motors, said circuit connections including current responsive devices and circuit connection changing means for relating the motors and different current responsive devices in different power circuit relations with the generator to drive the vehicle and to render each current responsive device operable, one of said devices being connected in a one circuit relation to respond and operate upon a preselected value of overload current through the motors, and another of said devices being connected in another circuit relation to respond and operate upon a preselected value of generator overload current, separate alarm means operatively connected to each of said current responsive devices and controlled thereby, a manually operable master controller for selectively controlling said prime mover speed and output regulating means to cause operation of said prime mover at preselected values of speed and output and for selectively controlling said circuit connection changing means, multiple control connections from each current responsive device adapted to be connected to other similar alarm means, and overload responsive means and multiple control connections from said master controller adapted to be connected to other similar prime mover speed and output regulating means and circuit changing means on similar vehicles for multiple unit control thereof from said master controller.

4. In a vehicle, a prime mover generator power plant, output regulating means for the power plant, traction motors operatively connected to drive and be driven by the vehicle, electrical connections between the generator of the power plant and the motors, said connections including a plurality of current responsive devices, a plurality of braking resistors adapted to be connected across individual motors to cause them to build up as generators to retard or brake the vehicle, circuit connection closing means for connecting the motors in different power circuit relations with the generator to drive the vehicle, said circuit closing means also serving for connecting one of the current responsive devices in each circuit relation or connecting the motors in separate braking-circuit relations, each braking-circuit including a motor and a braking resistor and at least one of said braking-circuits including a current responsive device, the electrical constants of each of the power and the braking circuits and the particular current responsive device included therein being selected to cause operation thereof at a preselected value of overload current on the generator or the motors when the vehicle is being driven by the motors or when retarded or braked thereby, separate alarm means controlled by separate current responsive devices, and a manually operable controller serving solely for selectively controlling the power plant output regulating means and said circuit closing means to establish the driving and braking connections and to vary the current in each driving connection.

STUART H. COWIN.